United States Patent [19]

Spisak

[11] 4,295,685

[45] Oct. 20, 1981

[54] PLASTIC AND METAL WHEEL TRIM ASSEMBLY

[76] Inventor: Edward G. Spisak, 35700 Oakwood La., Westland, Mich. 48185

[21] Appl. No.: 34,938

[22] Filed: Apr. 30, 1979

Related U.S. Application Data

[63] Continuation of Ser. No. 856,309, Dec. 1, 1977, abandoned.

[51] Int. Cl.³ .................................................. B60B 7/00
[52] U.S. Cl. ............................ 301/37 P; 301/37 CM; 301/108 A
[58] Field of Search ............. 301/37 R, 37 TC, 37 P, 301/37 CM, 37 TP, 37 PB, 102 R, 108 A, 108 TW, 6 CS; 29/159 A

[56] References Cited

U.S. PATENT DOCUMENTS

| | | | |
|---|---|---|---|
| 1,953,634 | 4/1934 | Reichenbach | 301/37 R |
| 2,404,390 | 7/1946 | Lyon | 301/37 R |
| 2,948,567 | 8/1960 | Lyon | 301/37 CM |
| 3,252,738 | 5/1966 | Huntley | 301/37 P |
| 3,876,257 | 4/1975 | Buergel | 301/37 P |

FOREIGN PATENT DOCUMENTS

| | | | |
|---|---|---|---|
| 625062 | 8/1961 | Canada | 301/37 CM |
| 1209798 | 10/1970 | United Kingdom | 301/37 P |

*Primary Examiner*—H. Grant Skaggs
*Attorney, Agent, or Firm*—Fisher, Gerhardt, Crampton & Groh

[57] ABSTRACT

A wheel trim assembly for vehicle wheels having a plastic body member with selected portions covered with a cover member made from thin metal and fastened to the exposed face of the plastic body member so that portions of the wheel trim have a metallic finish and remaining portions have a non-metallic finish.

4 Claims, 5 Drawing Figures

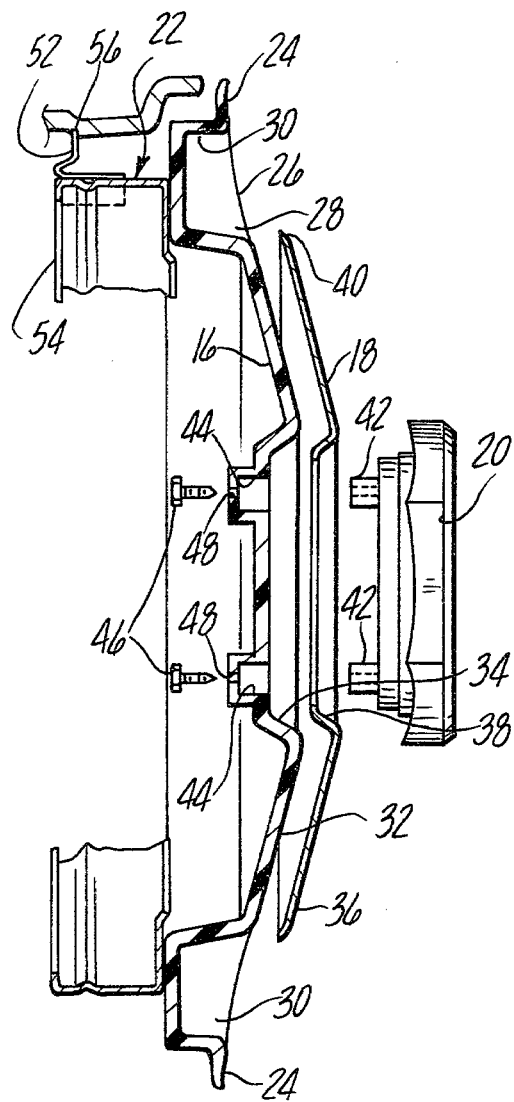
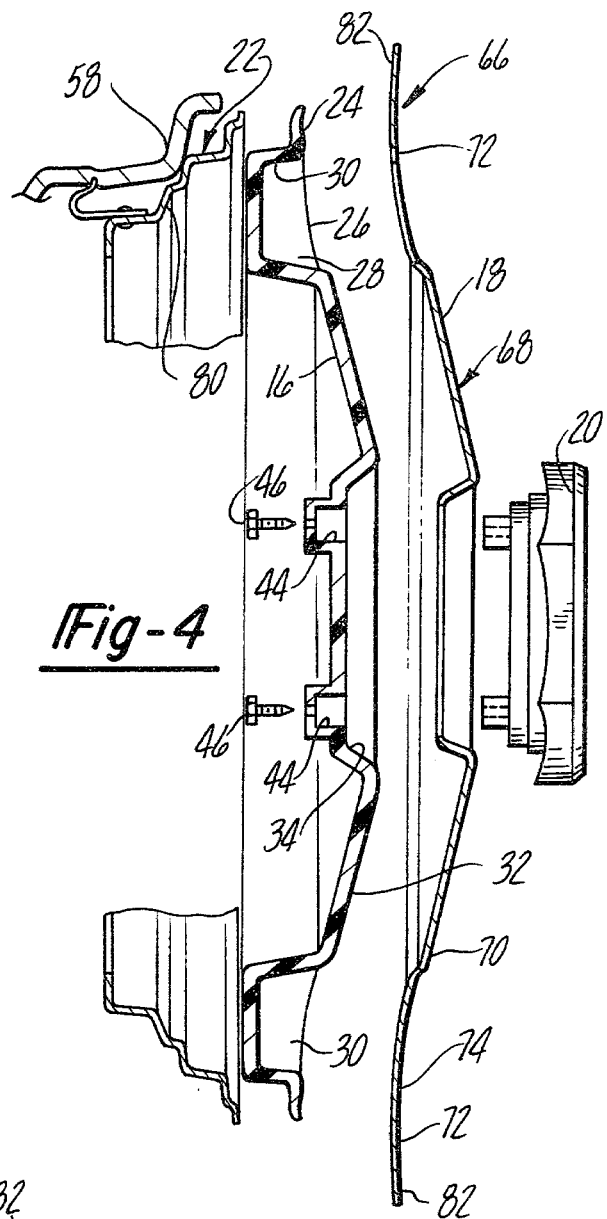
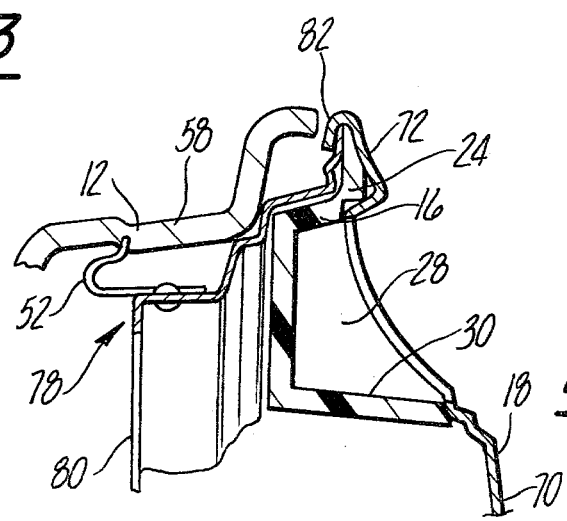

PLASTIC AND METAL WHEEL TRIM ASSEMBLY

This is a continuation of application Ser. No. 856,309, filed Dec. 1, 1977, now abandoned.

This invention relates to decorative wheel trim for vehicle wheels and more particularly to wheel trim including both plastic and metal components.

Automobile manufacturers are demanding wheel covers and wheel trim having intricate surface patterns some of which have very deep axially extending recesses so that it is not practical to make the wheel cover of stamped metal. As a result, such wheel covers often are made of plastic and subsequently are chrome plated at great expense to achieve a bright metal finish. Such plating often is not effective or needed where there are deep surface recesses and such areas usually are finished by painting.

To make a plastic wheel cover with bright metal finished surface portions it is necessary to mold a cover of high quality plastic and to subsequently treat the plastic so that it will accept a coating of copper and thereafter a coating of nickel to prepare the part for plating with chromium. If any portion of the part is to have a brushed metal finish it is necessary to interrupt the plating operation just prior to the chrome plating step and conduct the brushing operation. Thereafter, the entire part is plated to give a bright metal finish. It then becomes necessary to mask those areas which are to retain the bright metal finish and to subsequently paint the exposed unmasked portions. In contrast to this, metal wheel covers can be made of decorative metal and can have a bright metal finish without additional plating but if plating is desired it can be accomplished at far less expense than a corresponding plastic part.

It is an object of the invention to provide a wheel trim assembly for vehicle wheels which is a composite of plastic and sheet metal and in which the metal is applied to selected areas of the outboard surface of a plastic wheel trim member to afford the finished metal surfaces.

Another object of the invention is to provide a wheel trim assembly for vehicle wheels made of a composite of plastic and metal members so that the plastic member affords the construction or reinforcing features of deep recesses and so that the metal member can be located to afford a bright metal finish in the areas of the wheel trim assembly which requires such a finish.

Still another object of the invention is to provide a wheel trim assembly for attachment to a vehicle wheel wherein the plastic portions of the assembly are used in an as molded condition and without requiring any plating.

Another object of the invention is to provide a wheel trim assembly wherein the decorative metal layer applied to the face of a plastic body member also holds the wheel retaining mechanism in position in the wheel trim assembly.

The objects of this invention are accomplished by providing a wheel trim assembly and the method of making it wherein a body member of plastic material is formed to cover the outboard face of a vehicle wheel and is arranged to have selected surface portions applied with a metal finish. The plastic body member has selected or primary portions covered with a metal member and the two members are fastened together so that the selected surface portions have a metal finish and the remaining secondary portions have a non-metallic finish. The metal portion of the wheel trim assembly also is formed to hold a retention system in position which acts to hold the trim assembly in position on the vehicle wheel.

These and other objects of the invention will be apparent from the following description and from the drawings in which:

FIG. 3 is a view of the wheel cover assembly seen in FIG. 2 in an exploded condition;

FIG. 4 is a view similar to FIG. 3 illustrating another embodiment of the invention; and FIG. 5 is a view of a portion of the wheel trim assembly seen in FIG. 4 but at an enlarged scale and showing the wheel trim assembly in its assembled condition.

Figure 1:
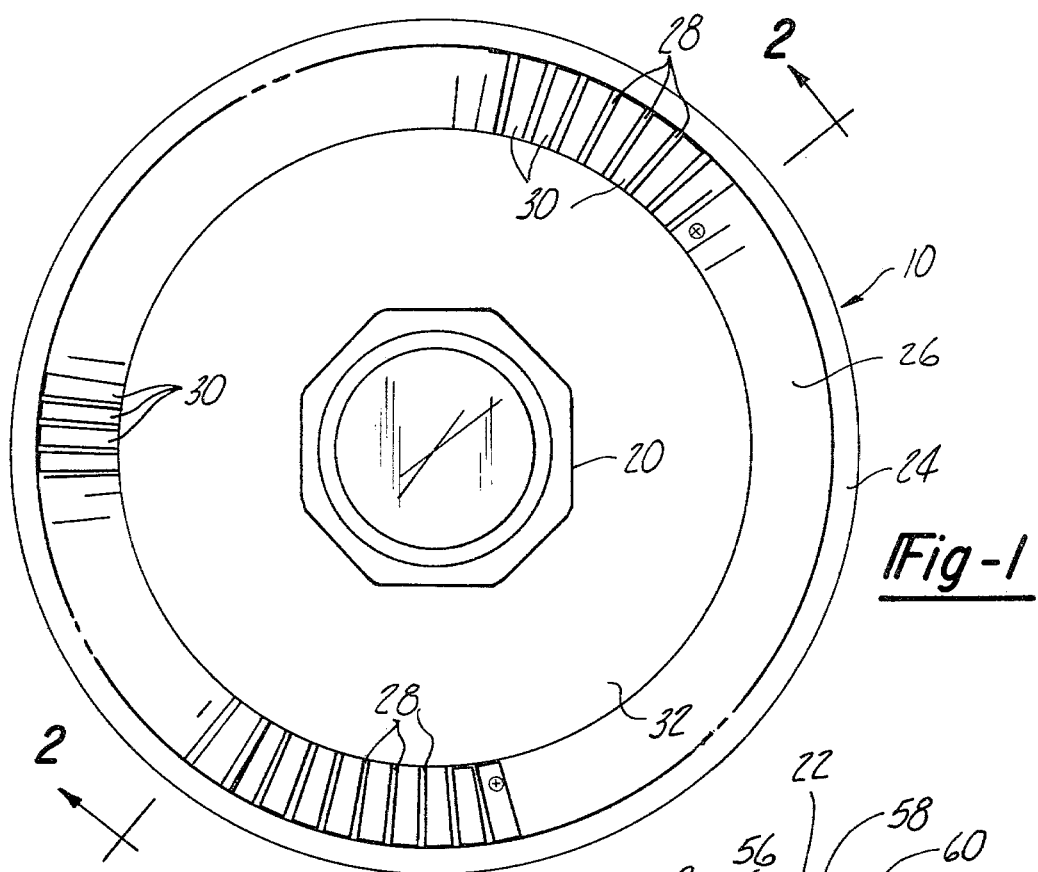
FIG. 1 is an elevation of the wheel trim assembly embodying the present invention.

Referring to the drawings, the wheel trim assembly embodying the invention is designated generally at 10 and is intended for attachment at the outboard side of a vehicle wheel 12 to cover substantially the entire outboard surface 14 of the wheel. The wheel trim assembly 10 includes a plastic body member 16, a metal cover member 18 and an ornamental hubcap 20. The wheel trim assembly also includes a retainng assembly 22 which acts to hold the trim assembly 10 in position on the wheel 12 of a vehicle.

The body member 16 is substantially disc-shaped and by way of example has an annular outer flange portion 24 and an adjacent annular area 26 that is formed with radially and axially extending walls 28. The walls 28 form recesses 30 therebetween. Disposed radially inwardly from the radially extending walls 28 is a central annular area 32 merging with a hub recess 34.

Because of its varying contour and in particular because of the relatively deep recesses 30 adjacent to and between the walls 28, the plastic parts of this type become extremely difficult to plate. In particular the recesses 30, which form surface areas spaced axially inwardly of the outer surfaces 24 and 32 as seen in FIG. 3, usually are inadequately plated and for this and other aesthetic reasons, such recesses often are painted following the plating operation. In the present instance the plastic body member 16 has portions of its exterior surface covered with a separate part of metal instead of being plated.

Figure 2:
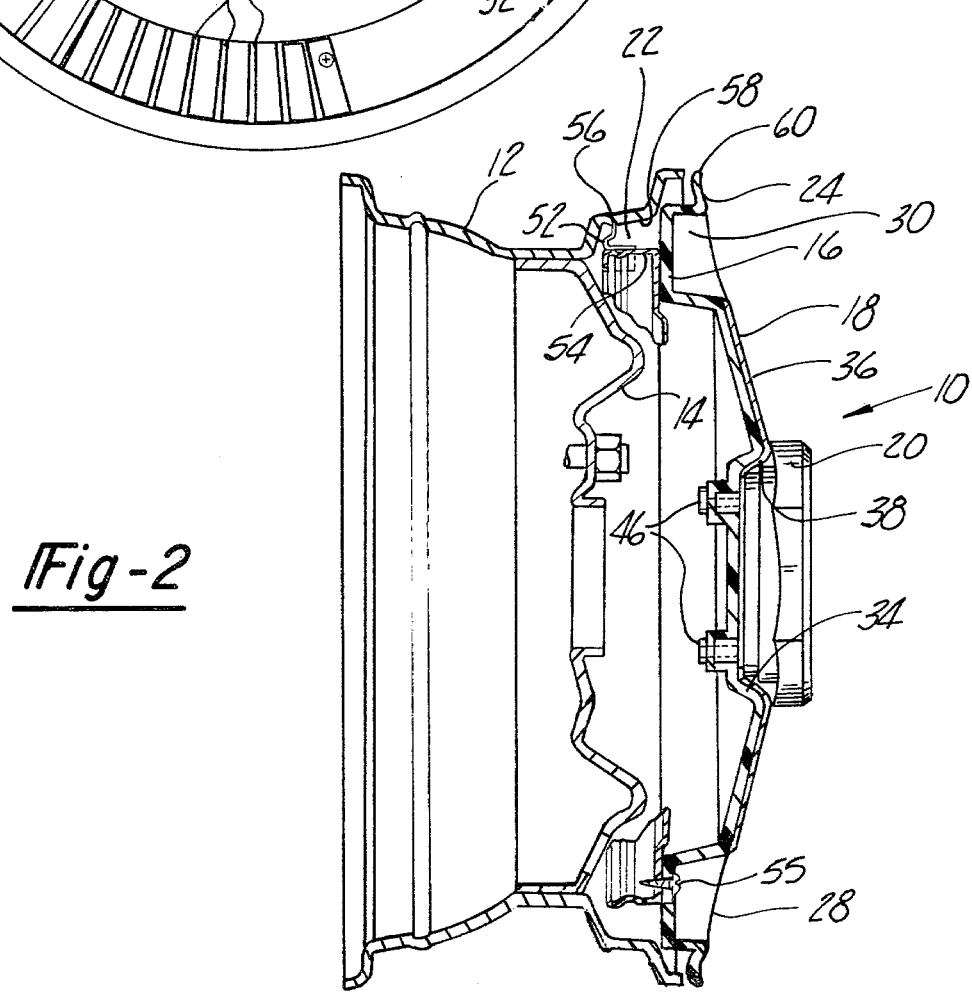
FIG. 2 is a cross sectional view taken on line 2—2 in FIG. 1.

Referring first to the embodiment of the invention seen in FIGS. 1 through 3, the plastic body member 16 has the central annular area 32 covered by the annular portion 36 of the cover 18. The radial inner edge of the annular portion 36 is formed with a flange 38 which extends into the hub recess 34. The radial outer edge 40 terminates adjacent the radial inner ends of the walls 28. The metal cover member 18 can be a metal stamping of very thin metal having an inner surface configuration conforming to the shape of the area of the body member 16 that is covered. If desired the cover 16 can be plated.

The metal cover member 18 is held with its inner surface in contracting relation with the surface of the plastic body member 16 by the hubcap 20 which by way of example, may be made of plastic material and subsequently plated. The hubcap 20 has a plurality of uniformly spaced bosses 42 that are adapted to be received in recesses 44 in the plastic body member 16. Screws 46 pass through openings 48 in the body member and are threadably engaged with the bosses 42 on the hubcap 20 so that the latter forms means fastening the cover member 18 into engagement with the plastic body member 16.

The retaining assembly 22 by which the wheel trim assembly 10 is held in position of the wheel 12 includes a plurality of uniformly spaced retention elements 52 mounted on an annular support member 54. The support member 54 is held relative to the plastic body member 16 by screws 55. The retention elements 52 are made of spring like steel and have an edge 56 for biting into a generally axially extending flange 58 of the wheel 12. As seen particularly in FIG. 2, the wheel 12 is engaged by the elements 52 so that the wheel trim 10 is retained in position with the circumferential edge 60 of the annular outer portion 24 extending radially outwardly to cover the entire wheel.

The embodiment of the invention seen in FIGS. 2 and 3 is particularly suited for making wheel trim assemblies in which the central annular area 32 between the hub 20 and the recesses 30 is to have a brushed or satin metallic finish. If the wheel trim assembly were made entirely of plastic such satin finishing would require removing the part from the plating process after the usual nickel coating has been applied and brushing the part. Thereafter the plastic member would be returned to the plating operation for application of the chromium plating. In the present embodiment of the invention, the plating operation of the plastic body member can continue without interruption and the metal cover member or stamping 18 may be brushed and plated separately at a reduction in time and cost.

The method of making the wheel trim assembly 10 is to mold the plastic body member 16 and to subsequently plate it. The metal cover member 18 may be stamped and plated and the retention assembly 22 each can be manufactured separately. The plastic body member 16, the metal cover 18, hubcap 20 and retaining assembly 22 are then assembled by properly aligning the parts and fastening them together with screws 46 and 55.

Referring now to FIGS. 4 and 5 another embodiment of the invention is shown in which a wheel trim assembly 66 has a plastic body member 16 identical with that used in the prior embodiment. In this instance however, a different metal cover member 68 is used to cover the central annular portion 32 as well as the top edges of the radially extending walls 28 and the outer annular portion 24. The cover member 68 is in the form of a metal stamping of thin metal having an outline defined by the support surfaces offered by the body 16. The cover 68 has a central annular shaped portion 70 and an annular outer ring 72 joined together by radially extending spoke like portions 74 which in the assembled condition of the wheel trim assembly 10 are complementary to and rest on the top support surfaces of the body 16 formed by the annular portion 24, the radially extending walls 28 and the central annular area 32.

The hubcap 20 is held relative to the metal cover member 68 and plastic body member 16 by screws 46 in the same manner as in the embodiment seen in FIGS. 2 and 3.

The wheel trim assembly 66 is held in position on a vehicle wheel by a retaining assembly 78 which includes a retaining ring 80 on which retaining elements 52 identical with those used in the prior embodiment of the invention are mounted for engagement with the axially extending wheel flange 58. The retention assembly 78 is held in position on the inboard or rear surface of the plastic body member by the cover member 68 which has a circumferential outer lip 82 which is bent around the outer edge of the plastic member 16 to press the ring 80 into tight engagement with the plastic body 16.

In the embodiment of the invention seen in FIGS. 4 and 5, all of the surfaces which are intended to have a bright metal finish act as a support surface and are covered by the cover member 68 leaving the axially extending recesses 30 unfinished and uncovered but surrounded by portions of the cover member. In this case the wheel trim assembly 66 can be manufactured without any plating of the plastic body member 16. As a consequence the body member 16 may be made of a lower grade plastic than would ordinarily be used and furthermore, painting operations can be completed before assembly without requiring masking or the painting can be completely eliminated by molding the plastic body member in the desired color.

In the method of manufacturing the wheel trim assembly 66, the plastic body member 16, the metal stamped cover member 68, the retainer assembly 78 and the hubcap 20 can all be formed separately. The cover member 68 can initially be held in position on the plastic body member 16 by the hubcap 20 held in position by screws 46. Thereafter the retainer ring 80 can be positioned at the inboard face of the plastic body member 16 and the lip 82 can be formed to hold the ring 80 in position.

A wheel trim assembly for attachment to a vehicle wheel has been provided in which a plastic body member is covered with a thin metal cover member so that a composite wheel trim assembly results in which selected or primary portions have a metal finish. The metal cover member not only furnishes the metal finish to the selected areas but also acts to reinforce the plastic body member so that thinner sections of plastic can be used. In one embodiment of the invention the metal cover member also can be used to secure the wheel retention system in position relative to the plastic body member.

The embodiments of the invention in which an exclusive property or privilege is claimed are defined as follows:

1. A composite wheel trim assembly of metal and plastic for attachment to a vehicle wheel, comprising: a unitary disc-shaped body member of plastic material having axially outwardly disposed primary surfaces and deep recesses having axially extending walls forming secondary surfaces extending from adjacent said primary surfaces for reinforcing said body member, said primary surfaces occupying a substantial portion of the area within the circumference of the body member, a metal cover member of thin sheet metal having an outline and axially inward surface configuration corresponding to the shape of said primary surfaces, fastening means coacting with said metal cover member and an inboard surface portion of said plastic body member to hold said cover member to said primary surface to reinforce said body member and provide a decorative metal layer having substantially all of its said inner surface in contacting relationship with all of said primary surface area and leaving said secondary surfaces exposed, and a retainer assembly attached to said body member for attachment to a vehicle wheel.

2. The wheel trim assembly of claim 1 wherein said means fastening said cover member to said support member include flange on said cover member adjacent to the circumferential edge to engage the rear face of said body member.

3. The wheel trim assembly of claim 1 wherein said recesses are arranged uniformly and symetrically between the outer circumference and the axial hub of said body member.

4. The wheel trim assembly of claim 1 wherein said mean fastening said cover member to said support member includes a hubcap engaging said cover member and being fastened to said support member.

* * * * *